March 16, 1926.
T. J. CONLEY
1,577,111
MECHANISM FOR OPERATING BRAKES OF MOTOR VEHICLES
Filed August 19, 1922
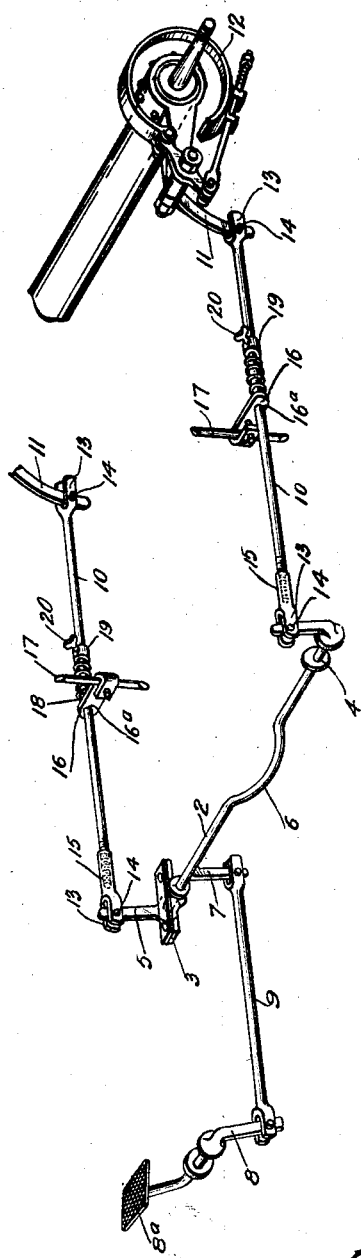
Inventor
T. J. Conley, Patented Mar. 16, 1926.

1,577,111

UNITED STATES PATENT OFFICE.

THOMAS JAMES CONLEY, OF WOONONA, NEW SOUTH WALES, AUSTRALIA.

MECHANISM FOR OPERATING BRAKES OF MOTOR VEHICLES.

Application filed August 19, 1922. Serial No. 582,945.

*To all whom it may concern:*

Be it known that I, THOMAS JAMES CONLEY, subject of the King of Great Britain and Ireland, residing at Campbell Street, Woonona, in the State of New South Wales, Commonwealth of Australia, have invented new and useful Improvements in Mechanism for Operating Brakes of Motor Vehicles, of which the following is a specification.

The hand brake appliances provided with a number of different types of motor vehicles are in many cases insufficient for the purpose and are not always reliable.

The invention that forms the subject of the present application for Letters Patent is an auxiliary foot pedal operated rear wheel brake. Hitherto it has been considered impossible to install an auxiliary pedal brake chiefly owing to the lack of space beneath the vehicle.

The invention will now be more particularly described and reference made to the accompanying sheet of drawings in which:—

Fig. 1 shows the general arrangement of the complete appliance detached from a motor vehicle and illustrates the manner in which it is attached to the band brake of a well known type of motor vehicle.

The transverse rocking or control bar 2 is secured in position upon an under face of the frame work of the body of the vehicle by means of bracket bearings 3, the part 4 lying in the bearing permitting it to be rocked therein in either direction as required. The ends of the rocking bar 2 are bent upwardly to form levers 5; the central portion of the bar is provided with a downward bend 6 to enable it to pass below and partly around the drive shaft tube or casing (not shown in the drawings) of the vehicle. Integral with and suitably positioned upon the bar 2 is a downwardly projecting arm or lever 7 that is operated by a pedal lever 8 to which it is pivotally connected by the connecting rod 9. Near their upper extremities the arms or levers 5 are articulated to connecting rods 10 that connect them to the levers 11 that operate the band brakes 12. The articulations are formed by yokes 13 at each end of the connecting rods 10 pivotally secured to their respective levers by pins 14 passed through both the levers and the yokes. The forward yokes are provided with internally threaded sleeves 15 adapted to receive the screw threaded ends of the connecting rods 10. The sleeves 15 are for adjustment purposes in order to adjust the length of the rod 10 to the distance between the pivotal points of the levers 5 and 11.

In order to return the several parts of the appliance to their normal position when the pedal 8ª has been released by the driver the rod 10 passes through a perforation 16ª in a stop 16 that is clamped or otherwise securely fastened to the running board bracket 17 or at any other convenient fixed point on the chassis or body of the vehicle. To the rear of the fixed stop 16 and surrounding the rod 10 is a helical spring 18 and slidable stop or short sleeve 19.

The stop 19 is for the purpose of regulating the compression of the spring 18 and is held rigidly in any predetermined position upon the rod 10 by means of the set screw 20.

The pedal 8ª is integral with the lever 8 and may be secured by means of a bracket bearing similar to the bracket bearing 3 or any other suitable means in a position convenient to the driver of the vehicle.

In operation, the depression of the pedal 8ª will force the lever 7 in a rearward direction and the levers 5 in a forward direction thus causing the rods 10 to make a longitudinal forward movement compressing the springs 18 between the stops 16 and 19 and moving the lever 11 so as to bring the band brake 12 into operation in a manner that is thoroughly understood. When the pedal is released the springs 18 come into operation and force the various parts back to the normal or "off" position.

The bend or curve 6 in the control rod 2 will be sufficient to allow the rod to rock in its bearings without striking the drive shaft tube or casing.

I claim:—

In a brake mechanism, a plurality of brake actuating levers, rods pivotally connected to said levers and extending forwardly, a transversely disposed rock shaft having upwardly extending arms pivotally connected to the forward ends of said rods, a downwardly extending arm fixed to the rock shaft and arranged intermediate the ends of the latter, a rocking foot pedal having a depending arm, a link connecting the depending arm to said downwardly extending arm, bearing members adapted to be connected to a vehicle frame and through which the rods slidably extend, sleeves mounted on said rods for adjustment axially thereof, and springs arranged between said sleeves and said bearing members for moving the rods in one direction.

In testimony whereof I have signed my name to this specification.

THOMAS JAMES CONLEY.